United States Patent [19]

Van Nocker

[11] 4,082,178

[45] Apr. 4, 1978

[54] HARPOON-TYPE CONVEYOR

[75] Inventor: Melvin Van Nocker, Kalamazoo, Mich.

[73] Assignee: Prab Conveyors, Inc., Kalamazoo, Mich.

[21] Appl. No.: 716,428

[22] Filed: Aug. 23, 1976

[51] Int. Cl.$^2$ .................. B65G 25/08; B65G 47/00
[52] U.S. Cl. .................................... 198/741; 198/772
[58] Field of Search .............. 198/736, 741, 747, 749, 198/755, 772, 389

[56] References Cited

U.S. PATENT DOCUMENTS

| | | | |
|---|---|---|---|
| 2,832,458 | 4/1958 | Ferguson et al. .............. | 198/389 |
| 3,828,920 | 8/1974 | Becker et al. .............. | 198/741 |

Primary Examiner—Evon C. Blunk
Assistant Examiner—Joseph E. Valenza
Attorney, Agent, or Firm—Dressler, Goldsmith, Clement, Gordon & Shore, Ltd.

[57] ABSTRACT

A reciprocating harpoon-type conveyor for transporting swarf-like material along a conveyor trough is provided with non-jamming barbs each of which comprises a multi-faced member secured to the inside surface of the upwardly extending walls of the conveyor trough. Each barb has an inwardly-slanted feed surface which increasingly projects into the conveyor trough in the downstream direction and a rearwardly slanted retaining surface which extends upwardly in the upstream direction and away from the bottom of the trough. An upstream edge portion and a downstream edge portion of each barb substantially merge with an upstanding wall of the conveyor trough. The feed surface is adapted for slidable passing of swarf-like material thereover as the material is moved forwardly in the conveyor. The slanted retaining surface is adapted for engaging and retaining a portion of the swarf-like material in place as the harpoon is retracted from a forward position to a rearward position during return stroke. Relatively large pieces of material that could jam between a barb and the harpoon during the return stroke are deflected upwardly by the rearwardly slanted retaining surface upon contact therewith.

14 Claims, 5 Drawing Figures

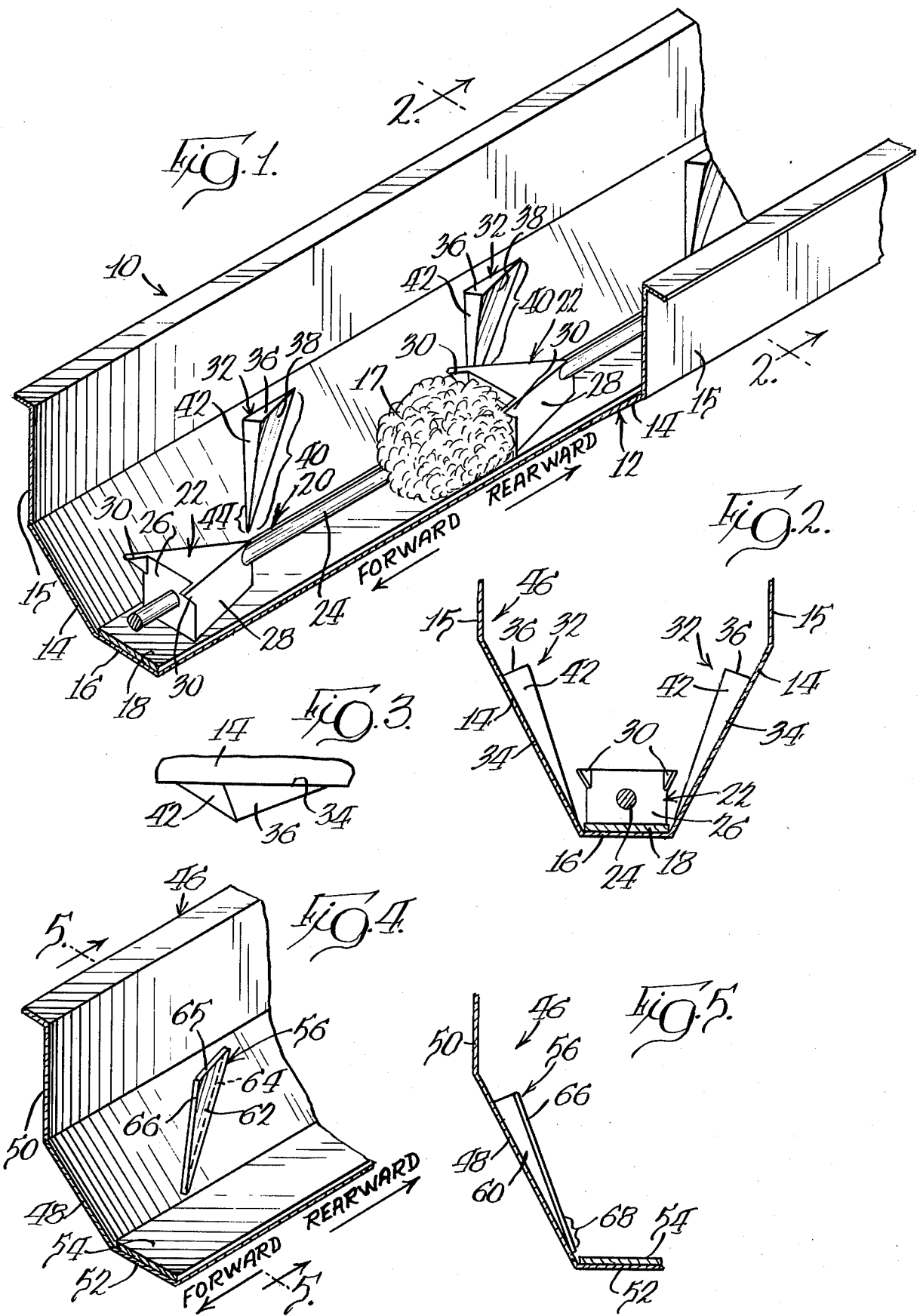

HARPOON-TYPE CONVEYOR

BACKGROUND OF THE INVENTION

This invention relates to conveyors. More particularly, this invention relates to the so-called harpoon-type conveyors suitable for transporting swarf-like materials.

A harpoon-type conveyor generally comprises one or more spaced, reciprocating drive members which usually comprise pairs of pushing blades, or harpoon plows, normally arranged in a V-shaped, or similar configuration. The harpoon plows are attached to a conveyor rod or chain, which may be and preferably is mounted on a suitable guide member situated in a conveyor trough. In any event, the harpoon plows are located in the trough and are adapted for reciprocating movement within the trough. Projecting members or barbs are secured to the inside surfaces of the conveyor trough and function to engage and retain the material being conveyed in the conveyor trough as the pushing blade or harpoon plow is shifted from a forward position to a rearward position during a return stroke. These conveyors are able to handle various types of swarf-like material, e.g., metal chips, from long and stringy to fine, with or without cutting fluids that may be present. Typical conveyors of this general type are illustrated in U.S. Pat. Nos. 3,112,025; 3,175,677; 3,158,257; 3,659,702; 3,799,329; 3,882,997; and 3,542,187; and German Pat. No. 1,139,068.

Though conveyors of this general type are generally well suited for transporting metal or plastic swarf, i.e., machining chips which are either relatively small and/or long and stringy, the conveyors experience problems when relatively large pieces of tramp material are mixed in with the swarf. These large pieces tend to wedge between the reciprocating harpoon plows and the barbs and cause jamming of the conveyor. In such instances, the conveyor must be stopped, and the larger pieces removed from the jammed conveyor. Jamming may also cause damage to the conveyor and/or the drive system therefor.

SUMMARY OF THE INVENTION

The present invention provides a novel barb design which permits a harpoon-type conveyor to handle swarf-like materials together with large pieces of scrap metal, plastic, and the like, without jamming.

Barbs of the present invention are located on the inner wall surfaces of the conveyor trough within which the swarf-like material is transported and have two surfaces: an inwardly slanted feed surface which increasingly projects into the conveyor trough in the downstream direction of material transport and a rearwardly slanted retaining surface which extends upwardly in the upstream direction of material transport. Preferably, the upstream edge of the feed surface and the lower end of the downstream edge portion of the retaining surface substantially merge with the wall of the conveyor trough. In this way, when the harpoon plow is moved in the forward direction, the swarf-like material is transported forwardly in the trough and slides over the inwardly slanting feed surface of a barb. On the return stroke, the harpoon plow tends to drag the swarf-like material rearwardly in the trough; however, as the material begins to move rearwardly, the material impinges upon the retaining surface of the barb and is retained by the barb in that position. Where a relatively large piece of material is dragged rearwardly by the harpoon plow against the retaining surface of the barb, the piece, instead of jamming, rides upwardly along the rearwardly-slanting retaining surface and eventually out of contact with the harpoon plow. In this manner, wedging of relatively large pieces between the barbs and the harpoon plow is minimized.

In addition, when very fine material chips are transported, the inwardly projecting feed surfaces of the barbs tend to channel the chips towards, and thus maintains the chips closer to, the center line of the trough and in the path of the harpoon plow. Were it not for the inwardly projecting feed surfaces of the barbs, the very fine chips would tend to spread out over the bottom of the conveyor trough, thereby reducing transport efficiency. The upwardly extending retaining surface, being relatively wide, functions to minimize the amount of chips from being dragged rearwardly during the return stroke of the harpoon plow.

Numerous other advantages and features of the present invention will become readily apparent from the following detailed description of the invention, from the claims and from the accompanying drawings in which each and every detail shown is fully and completely disclosed as a part of this specification.

BRIEF DESCRIPTION OF THE DRAWING

In the accompanying drawings forming part of the specification, and in which like numerals are employed to designate like parts throughout the same, FIG. 1 is a fragmentary perspective view of a harpoon-type conveyor embodying the present invention, partially broken away to show interior detail;

FIG. 2 is a cross-sectional view of the conveyor of the present invention taken along plane 2—2 of FIG. 1;

FIG. 3 is a fragmentary plan view of a barb embodying the present invention;

FIG. 4 is a fragmentary perspective view of a harpoon-type conveyor showing another embodiment of the present invention, partially broken away to show interior detail; and FIG. 5 is a cross-sectional view along plane 5—5 of FIG. 4.

DESCRIPTION OF THE PREFERRED EMBODIMENTS

While this invention is susceptible of embodiment in many different forms, there are shown in the drawings and will herein be described in detail preferred embodiments of the invention. It should be understood, however, that the present invention is to be considered as an exemplification of the principles of the invention and is not intended to limit the invention to the embodiments illustrated.

Referring to FIGS. 1 and 2, harpoon conveyor 10 comprises a conveyor trough 12 having upstanding wall means which include slanting wall 14 and contiguous vertical wall 15 on either side of trough bottom 16. Conveyor 10 contains swarf-like material 17 as illustrated in FIG. 1. Such swarf-like material can be the cuttings, chips, and/or turnings resulting from machining of materials such as metal, plastic, wood and the like. Bearing member 18 is provided on trough bottom 16 for supporting, and accommodating, the sliding reciprocating movement of harpoon means 20. Harpoon means 20 consists of a plurality of spaced, reciprocating harpoon plows 22 which are mounted on conveyor rod 24 and which push the swarf-like material forwardly along conveyor trough 12 when harpoon means 20 is moved forward. Conveyor rod 24 is driven by appropriate reciprocating drive means (not shown) attached to one end thereof. Harpoon plows 22 each have a front push surface 26 and slanted, converging V-shaped blades 28 which form a wedge for penetrating through the swarf-like material when harpoon means 20 is moved rearward. Blades 28 terminate on the downstream, or forward, end of harpoon plow 22 in sharp, pointed prongs 30. By such construction, relatively small fines of chip material can be pushed forward by push surface 26, and larger bundles of stringy metal or stringy plastic cuttings or turnings can be engaged by prongs 30 and moved along in the forward direction. When harpoon plow 22 is moved in the rearward direction, the converging V-shaped blades 28 tend to pass through the swarf-like material. To prevent harpoon plow 22 from dragging the swarf-like material rearwardly during the return stroke of reciprocating harpoon means 20, barbs 32 are provided on the inside surfaces of upstanding slanting wall means 14 of trough 12.

Barbs 32 are shown located on wall means 14 on opposite sides of trough 12 and adjacent to harpoon means 20. Pairs of opposed barbs 32 may lie directly across the trough from each other or opposed barbs 32 may be staggered or offset relative to each other.

In one embodiment, each barb 32 has the shape of a solid irregular four-sided pyramid. Pyramid-shaped barb 32 has a back side 34 (FIG. 2) which lies parallel to, and in contact with, upstanding slanting wall 14. Barb 32 can be secured to upstanding slanting wall 14 by appropriate means such as bolts, screws or welds. Pyramid-shaped barb 32 also has a shoulder which projects outwardly from upstanding slanting wall 14 and presents top surface 36. The angle formed by this top surface 36 with upstanding slanting wall 14 is not critical.

Each barb 32 is provided with a feed surface 38. Feed surface 38 is generally smooth and slants inwardly towards the center of trough 12 and increasingly projects into trough 12 in the downstream direction. Upstream edge portion 40 substantially merges with upstanding slanted wall 14 to provide a relatively smooth transition from wall 14 to feed surface 38.

To prevent the chip materials from being dragged rearwardly past barb 32, each barb 32 has retaining surface 42 as shown in FIGS. 1 and 2. Retaining surface 42 is generally triangular in shape and projects outwardly from upstanding slanted wall 14. As shown in FIG. 3, retaining surface 42 slants rearwardly and extends upwardly in the upstream direction, preferably to a height greater than the height of harpoon plow 22. In this manner, if a relatively large piece of tramp material tends to lodge between any part of harpoon means 20 (e.g., blade 28) and barb 32, the tramp material impinges upon retaining surface 42 and slides or rides upwardly along retaining surface 42 above and out of contact with harpoon means 20. This allows harpoon means 20 to pass under the potentially interfering piece of material. Large pieces of material are thus unable to jam harpoon means 20.

Edge portion 44 of retaining surface 42 is in contact with, and substantially merges with, upstanding slanted wall 14 on the downstream end portion of barb 32. The angle formed between retaining surface 42 and upstanding slanted wall 14 may be an acute or obtuse angle but preferably is substantially a right angle.

Another embodiment of the present invention is illustrated in FIGS. 4 and 5. Conveyor portion 46, similar to conveyor 10 in FIGS. 1-3, is shown with upstanding slanted wall 48 and upstanding vertical wall 50. Wall 48 is attached to, and rises from, trough bottom 52. Supported on trough bottom 52 is bearing member 54 which slidably supports a harpoon means similar to that shown in FIGS. 1-3.

Barb 56 is provided on upstanding slanted wall 48 for retaining swarf-like material when the harpoon means is reciprocated in the rearward direction. Barb 56 is a triangular-shaped plate having two opposed major side surfaces: back surface 60 and feed surface 62. The plate-like barb 56 has peripheral side faces 64, 65 and 66. One of the peripheral side faces, face 64 (FIG. 4), lies along, and is in contact with, upstanding slanted wall 48. Side face 64 may be angled or beveled with respect to feed surface 62 to provide a mating edge on the upstream end of feed surface 62 which substantially merges with upstanding slanted wall 48. Alternatively, peripheral side face 64, if not beveled, may be attached to upstanding slanted wall 48 by an appropriate fillet weld to form a substantially smooth merging connection between feed surface 62 and upstanding slanted wall 48.

Barb 46 is slanted with respect to conveyor 46 so that it increasingly projects into the trough of the conveyor with increasing downstream distance. This has the objective of projecting peripheral side face 66, providing the retaining surface, inwardly towards the center of conveyor 46. The retaining surface provided by side face 66 also extends upwardly in the upstream direction along conveyor 46 and has downstream edge portion 68 which substantially merges with upstanding slanted wall 48. This structure thus provides an inclined plane which, when a large piece of material is dragged by the harpoon means in the rearward direction during a return stroke, guides the large piece of material upwardly along the barb and out of the path of the harpoon means, thereby avoiding jamming.

In both illustrated embodiments of the invention, the four-sided pyramid barb and the triangular plate barb, the retaining surface (42 or 66) must slant rearwardly and extend upwardly in the upstream direction. Thus, the retaining surface is at an acute angle with respect to a plane normal to the direction of the harpoon movement in the trough. This angle is less than about 45° and preferably is about 5° to about 35°.

In the embodiment utilizing pyramid-shaped barbs 32 (FIGS. 1-3), retaining surface 42 is relatively large. This is a particularly useful feature when handling fine particulate material because much of the material is prevented from being dragged backwards during the return stroke of the harpoon means by these larger retaining surfaces on the barbs.

In the alternate embodiment, shown in FIGS. 4 and 5, utilizing triangular-shaped plate barb 56, another advantage can be realized when large scrap pieces are present. Since triangular plate barb 56 is attached to the upstanding slanted wall 48 along the upstream edge of feed surface 62, and since the plate barb is free of the upstanding slanted wall 48 on the downstream edge of the feed surface, a degree of cantilevered flexibility is present in the plate. Thus, plate barb 56 can be slightly flexed inwardly to allow passage of large scrap pieces in the forward direction.

Plate barb 56 has another advantage when used solely to convey fine particulate swarf. The particles that are carried back in the rearward direction by the harpoon means tend to fill in the gap between upstanding slanted wall 48 and triangular plate barb 56. Thus, during operation of the conveyor, the spaces between barbs 56 and upstanding slanted wall 48 become filled with the fine particles to form, in effect, an extension of retaining surface 66. Under these conditions, triangular plate barb 56 approximates the four-sided pyramid-shaped barb 32 of FIGS. 1-3.

The foregoing embodiments are intended as illustrative and are not to be taken as limiting. Numerous variations and modifications thereof may be effected without departing from the spirit and scope of the present invention.

I claim:

1. In a harpoon-type conveyor for transporting swarf-like material which includes a conveyor trough having an upstream end and a downstream end and defined by upstanding trough wall means, and a reciprocating harpoon means in said trough adapted to reciprocate between a rearward position and a forward position while urging the swarf-like material along said trough, the improvement comprising:
at least a pair of opposed barbs mounted inside said trough and having a rearwardly slanted retaining surface adapted for engaging and retaining a portion of said material in place as said harpoon means is moved from said forward position to said rearward position during a return stroke, and an inwardly slanting feed surface adapted for slidably passing said material thereover during a forward stroke; said slanted retaining surface extending upwardly away from the bottom of said trough in the upstream direction whereby a potentially interfering piece of material in said trough rides up said slanted retaining surface without substantial interference with said return stroke.

2. The improvement in accordance with claim 1 in which each said barb is a plate member having a rearwardly slanted peripheral face presenting said retaining surface.

3. The improvement in accordance with claim 2 in which said retaining surface forms an acute angle with a plane normal to the direction of said harpoon means reciprocating movement of less than about 45°.

4. The improvement in accordance with claim 2 in which said retaining surface forms an acute angle with a plane normal to the direction of said harpoon means reciprocating movement of about 5° to about 35°.

5. The improvement in accordance with claim 1 in which each said barb is a four-sided pyramid one side of which presents said retaining surface.

6. The improvement in accordance with claim 5 in which said retaining surface forms an acute angle with a plane normal to the direction of the harpoon means reciprocating movement of less than about 45°.

7. The improvement in accordance with claim 5 in which said retaining surface forms an acute angle with a plane normal to the direction of the harpoon means reciprocating movement of about 5° to about 35°.

8. The improvement in accordance with claim 1 in which said slanted retaining surface is provided with a downstream edge portion substantially merging with said trough wall means.

9. In a harpoon-type conveyor for transporting swarf-like material which includes a conveyor trough having an upstream end and a downstream end and defined by upstanding trough wall means, and a reciprocating harpoon means in said trough adapted to reciprocate between a rearward position and a forward position while urging the swarf-like material along said trough, the improvement comprising:
a plurality of opposed barbs mounted on the inner surface of said conveyor trough wall means and adjacent to said harpoon means, said barbs having an inwardly slanted feed surface adapted for slidably passing said material thereover as said material is transported along said trough and having a rearwardly slanted retaining surface adapted for engaging and retaining at least a portion of said material in place as said harpoon means is moved from said forward position to said rearward position during a return stroke;
said feed surface increasingly projecting into said trough in the downstream direction and having an edge portion substantially merging with said trough wall means on the upstream end of said feed surface; and
said retaining surface extending upwardly in the upstream direction and having a downstream edge portion substantially merging with said trough wall means whereby a potentially interfering piece of material in said trough rides up said slanted retaining surface without substantial interference with said return stroke.

10. The improvement in accordance with claim 9 in which each said barb is a triangular plate having a peripheral face which presents said retaining surface and a side face which presents said feed surface.

11. The improvement in accordance with claim 9 in which each said barb is a four-sided pyramid having a top side, a back side, a side presenting said retaining surface, and a side presenting said feed surface.

12. The improvement in accordance with claim 11 in which said retaining surface forms an acute angle with a plane normal to the direction of said harpoon means reciprocating movement of less than about 45°.

13. The improvement in accordance with claim 11 in which said retaining surface forms an acute angle with a plane normal to the direction of said harpoon means reciprocating movement of about 5° to about 35°.

14. The improvement in accordance with claim 9 wherein said retaining surface extends upwardly to a height greater than the height of said harpoon means.

* * * * *

UNITED STATES PATENT AND TRADEMARK OFFICE
CERTIFICATE OF CORRECTION

PATENT NO. : 4,082,178
DATED : 4 April 1978
INVENTOR(S) : Melvin Van Nocker

It is certified that error appears in the above—identified patent and that said Letters Patent are hereby corrected as shown below:

Col. 2, line 51, "invention" should be -- disclosure --.

Signed and Sealed this

Third Day of October 1978

[SEAL]

Attest:

RUTH C. MASON
Attesting Officer

DONALD W. BANNER
Commissioner of Patents and Trademarks